United States Patent [19]

Bond et al.

[11] Patent Number: 4,713,835
[45] Date of Patent: Dec. 15, 1987

[54] TELEPHONE ANSWERING MACHINE WITH AUTOMATIC RECORDING AND VISUAL DISPLAY OF TIME AND DATA

[75] Inventors: Raymond G. Bond, Long Beach; Gerald L. Mock, Corona, both of Calif.

[73] Assignee: Fortel Corporation, Compton, Calif.

[21] Appl. No.: 861,355

[22] Filed: May 9, 1986

[51] Int. Cl.$^4$ ............................................. H04M 1/65
[52] U.S. Cl. .......................................... 379/79; 379/70
[58] Field of Search ....................... 379/70, 79, 73, 74; 360/72.1, 74.4, 74.1

[56] References Cited

U.S. PATENT DOCUMENTS

| | | | |
|---|---|---|---|
| 4,304,968 | 12/1981 | Klausner et al. | 379/74 |
| 4,345,114 | 8/1982 | Sato et al. | 379/79 |
| 4,469,919 | 9/1984 | Nakamura et al. | 379/73 |
| 4,500,753 | 2/1985 | Plunkett, Jr. | 379/70 |
| 4,514,593 | 4/1985 | Hattori et al. | 379/74 |

*Primary Examiner*—Raymond F. Cardillo
*Assistant Examiner*—James E. Tomassini
*Attorney, Agent, or Firm*—Keith D. Beecher

[57] ABSTRACT

A telephone answering machine which records and displays the date and time of each recorded incoming message and, if required, displays the duration of each message. The telephone answering machine is microcomputer controlled, and when a call is received, the random access memory of the microcomputer stores a number equivalent to the time and date on which the telephone line was seized. The telephone answering machine then records the call in normal manner. At the end of the call, a second number representing the time at which the call terminated may also be stored in the random access memory. At that time, the microcomputer causes the message tape to rewind to a point past the beginning of the recorded message and causes the data and time at which the message was received to be recorded on a blank portion of the tape just before the beginning of the message. The microcomputer then causes the tape to move forward to the end of the message in preparation for taking the next call. In each case, a blank portion is provided on the tape between recorded messages for recording the data. On playback, the data is sensed and the microcomputer causes the data to be transferred to a visual display.

8 Claims, 5 Drawing Figures

TELEPHONE ANSWERING MACHINE WITH AUTOMATIC RECORDING AND VISUAL DISPLAY OF TIME AND DATA

BACKGROUND OF THE INVENTION

The telephone answering machine of the invention is generally similar to the telephone answering machine disclosed in U.S. Pat. No. 4,469,919. As described in that patent, present-day telephone answering machines often use two separate cassette-type tape drives. One tape drive is used to play back a pre-recorded outgoing message from one of the cassettes when a telephone call is received. The outgoing message typically states that the person is unable to come to the telephone and that a message may be recorded at the sound of a tone. When the caller hears the tone, he then dictates his messaoe into the telephone, and his message is recorded by the second or incoming message tape drive onto the second cassette tape.

After recording of the incoming message is completed, the incoming message tape drive stops. The answering device then reverts to an automatic answer mode and waits until a new incoming message is received at which time the outgoing announcement tape drive is activated and, subsequently, the incoming message tape drive is restarted. Each incoming message is sequentially recorded on the incoming message tape. To listen to the recorded messages, the user rewinds the incoming message tape to the beginning of the tape, and then places the second tape drive into a playback mode. The recorded messages are then sequentially played back in the order in which they were received.

It is often desirable to know the exact date and time that a particular message was received. The telephone answering machine disclosed in U.S. Pat. No. 4,469,919 is one which automatically records date and time information indicating when a message is received, and the machine displays the time and date as to that particular message, as the message is being played back. However, the telephone answering machine described in U.S. Pat. No. 4,469,919 requires two separate tracks for recording the incoming messages and the data indicating the date and time each such message was received. It is an objective of the present invention to provide an improved and simplified telephone answering machine in which the incoming messages and data relating to the date and time of each message are recorded on a single track.

Another objective of the invention is to provide such a system which may be constructed to produce a continuous display of the time at which each message was received for the duration of that message, as the messages are played back. Optionally, a second display may be used, or the first display may be switched to a second mode, to show the duration of the message being played back, in addition to the time at which the message was received.

Yet another objective of the invention is to provide such a system in which, during playback of the messages, time may be counted beginning with the time each message was received in a manner such that the actual message receiving time progresses in correspondence with the actual time progression during the time at which the call was recorded.

Yet another objective of the invention is to provide such a system which may be constructed so that, as the time duration of a message is displayed at the beginning of playback of that message, time is kept in a reverse counting condition so that the user may see the constantly reducing remaining time required for playback of the current message.

A still further objective of the invention is to provide such a machine, in which the data recording of the time of each message is kept in the microcomputer memory, and time data for the visual display is recovered in a sequential manner as each of the messages is played back in sequence, with the microcomputer using beep tones between the messages, or a special "mark tone" or a special data word containing the message number after each message. If a data word is used, the microcomputer records the data word subsequent to the incoming message without having to rewind the incoming message tape, thereby placing a sequential count after each message which may be correlated with the time stored in the random access memory of the microcomputer on subsequent playback.

Another object of the invention is to provide such a system in which the random access memory data is stored as described in the preceding paragraph on a specific location for subsequent retrieval by the microcomputer in the case of a power failure. This location, for example, may be at the beginning of the incoming message tape or at the end of the outgoing message tape.

Briefly stated, the telephone answering machine to be described is controlled by a microcomputer which includes a random access memory. In addition, a digital clock is included within the microcomputer using processed microcomputer timing, or an external clock may be used with appropriate interconnections.

DETAILED DESCRIPTION OF THE ILLUSTRATED EMBODIMENT

Figure 1A:
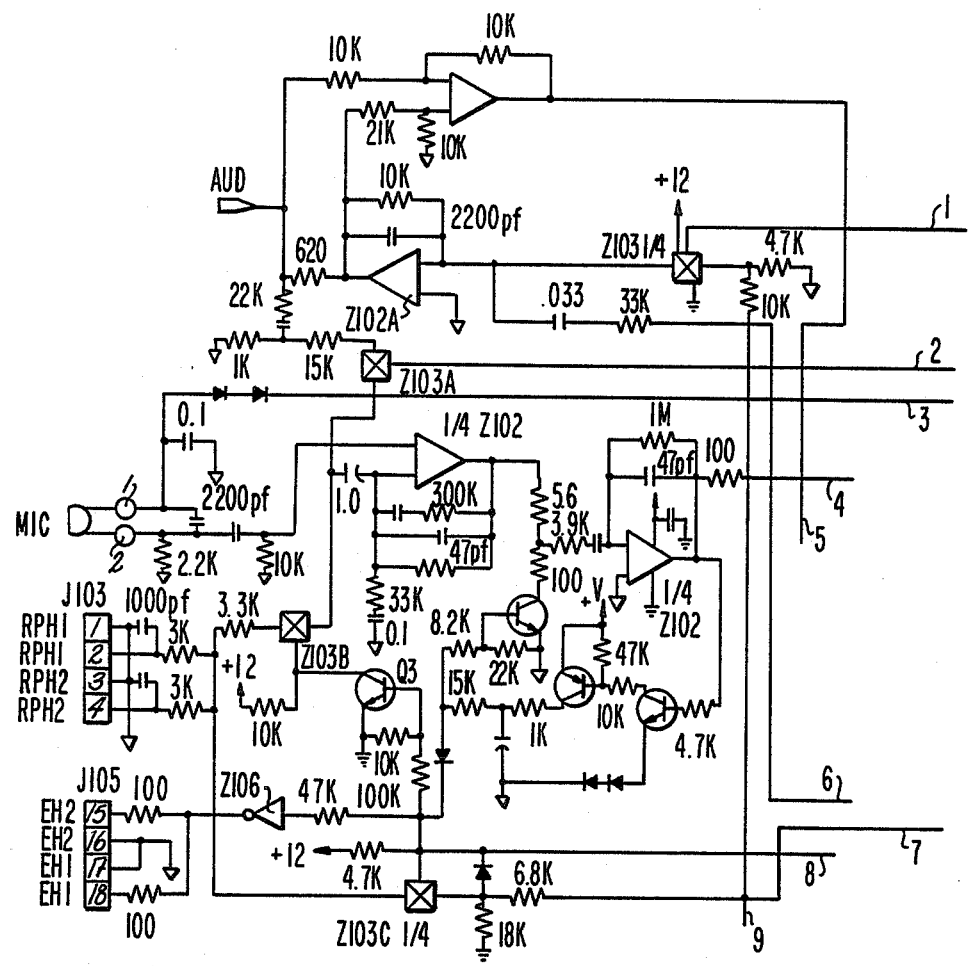
FIGS. 1A and 1B together constitute a circuit diagram of a portion of a telephone answering machine constructed to embody the concepts of the invention.
Figure 1B:
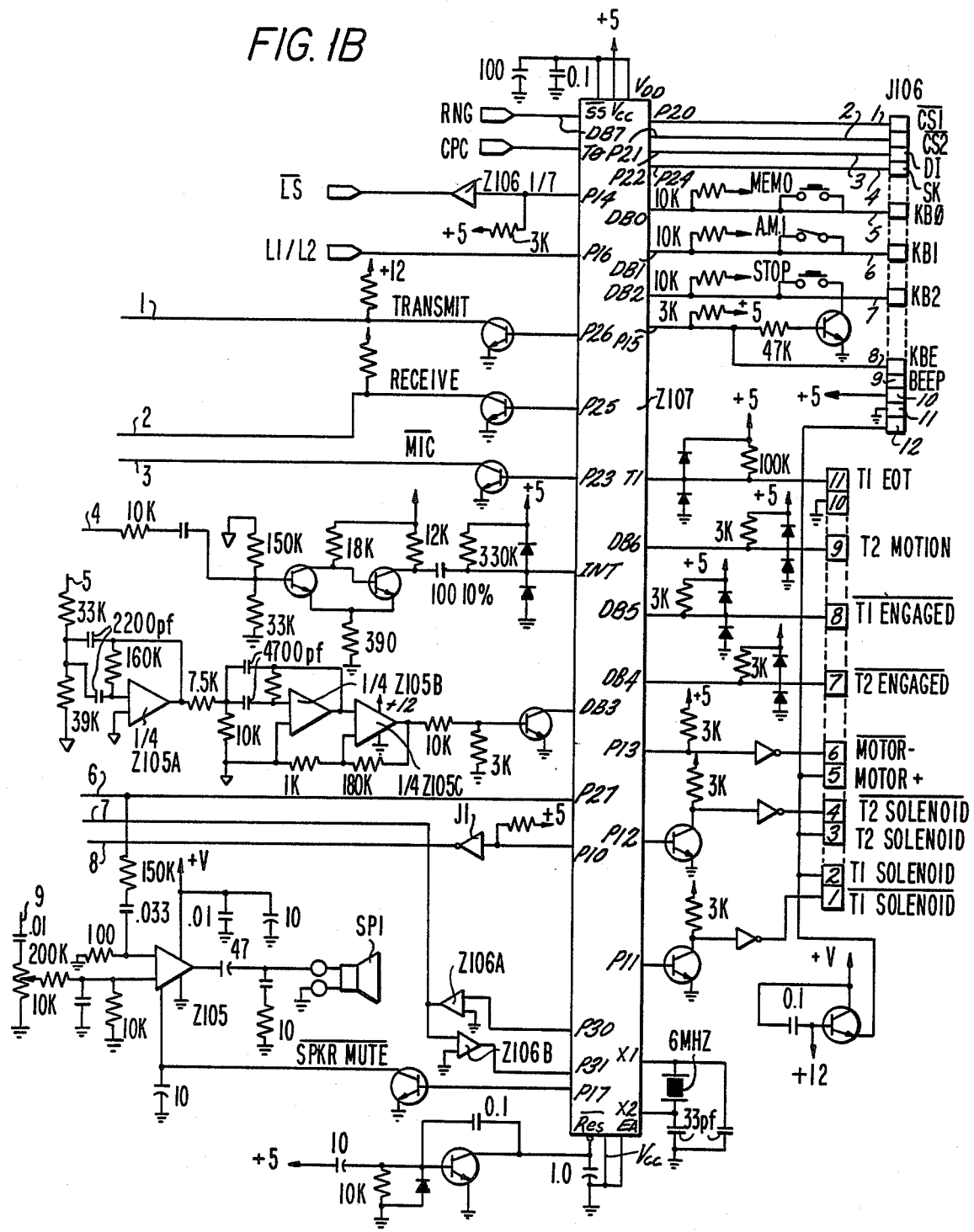

The telephone answering machine is controlled by a microcomputer Z107 (FIG. 1B) which may be of the type manufactured and sold by the National Semiconductor Company, and which is designated by them as type No. INS8050. The system detects ring signals on either of two telephone lines by a ring detect circuit illustrated in FIGS. 2A and 2B. Ring signals on either of the two telephone lines are processed by the circuit of operational amplifiers Z301A-Z301E of FIG. 2B, and passed through the circuit of transistor Q1 to a "ring" terminal which is connected to pin DB7 of microcomputer Z107 of FIG. 1B.

Figure 2A:
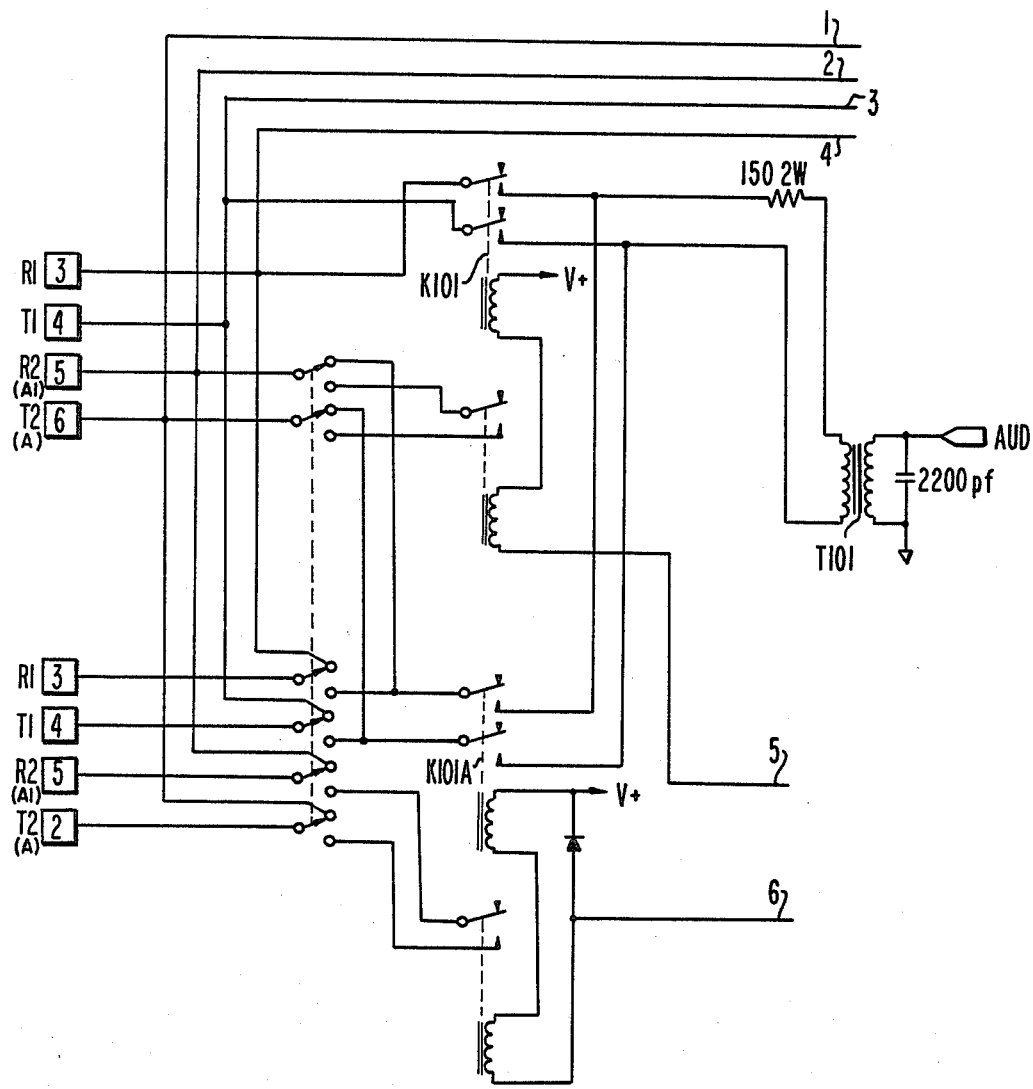
FIGS. 2A and 2B together constitute a circuit diagram of another portion of the machine.
Figure 2B:
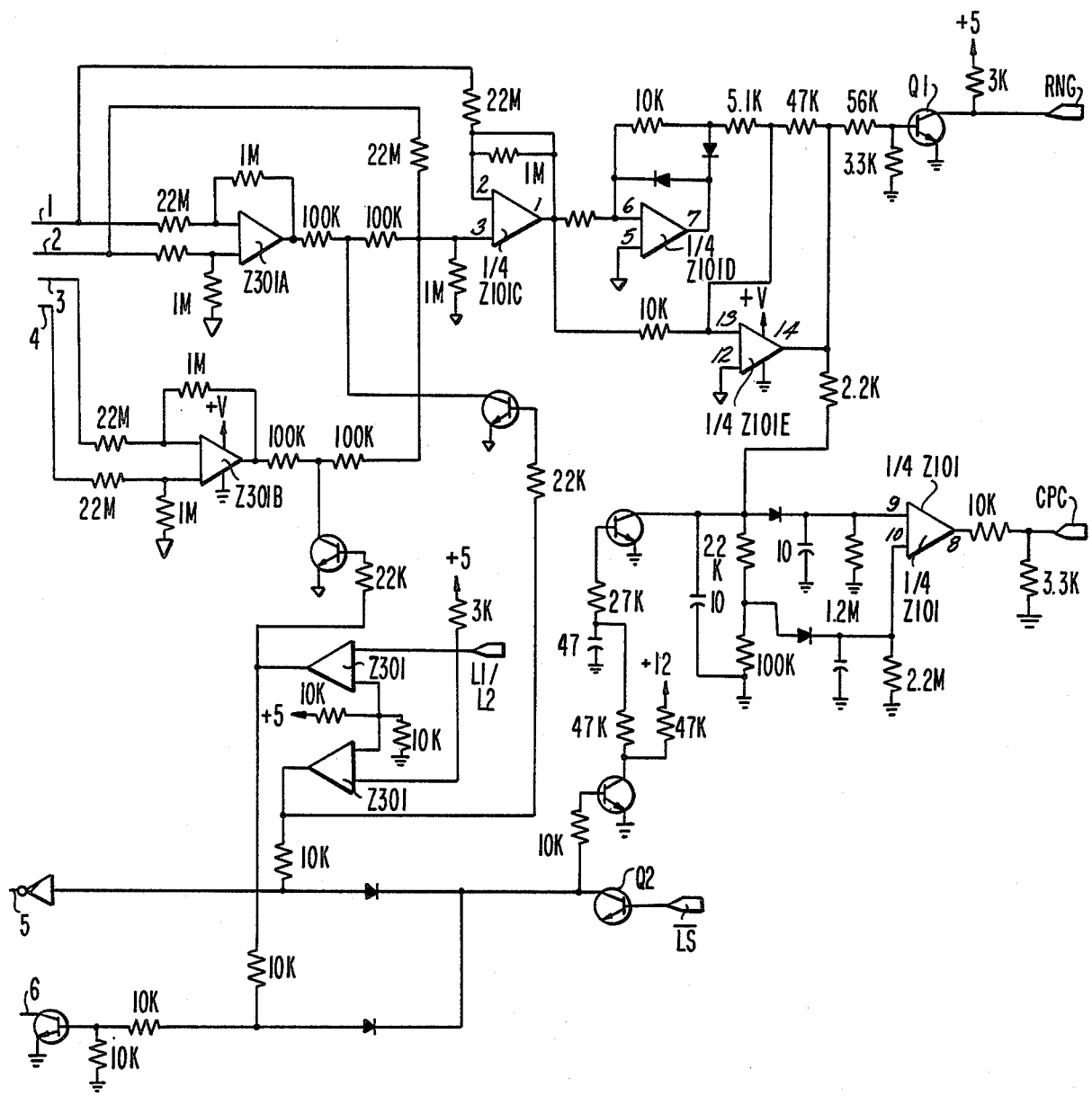

When a ring signal is detected, the microcomputer causes pin P14 to go high, and the signal $\overline{LS}$ causes transistor Q2 of FIG. 2B to activate either relay K101 or relay K101A of FIG. 2A, depending upon which line the ring signal was received. When either of the relays K101 or K101A is energized, the incoming message over the telephone line is fed to transformer T101. Upon the receipt of the ring signal, pin P25 of microcomputer Z107 goes high, conditioning the system to its receive mode. This closes switch Z103A of FIG. 1A. When the pin 10 goes high switch Z103B is closed, so that the incoming audio may be recorded on the message tape. At this time, pin P12 of the microcomputer Z107 is also caused to go high so that the T2 solenoid of the system may be energized in order that the magnetic tape mechanism may be activated, and pin P13 also goes high so that the tape drive motor may be energized. Under such conditions, the magnetic tape mechanism is activated so that the incoming message may be recorded on the message tape.

At the end of the incoming message, and under the control of the circuitry of operational amplifiers Z501A, Z501B, Z501C, pins P12 and P13 of microcomputer Z107 again go low stopping the forward motion of the magnetic tape mechanism.

Pin DB6 of the microcomputer now goes high, and pins P12 and P13 again go high, causing the message tape to reverse, and rewind to a blank portion at the beginning of the just-received message, at which time the pins DB6, P13 and P12 go low, stopping the tape. Then, pins P12 and P13 go high, and the tape moves in the forward direction at which time data stored in the memory of the microcomputer is recorded on the message tape.

For example, when the relay K101 or K101A of FIG. 2A first seizes the line, a clock in the microcomputer causes a number to be stored in the computer's memory which is equivalent to the time and date at which the line was seized. This number is recorded on the blank portion of the tape at the beginning of the message. The preferred embodiment is to record this data after the message is completed in order to avoid delays in the recording and to allow the message end or length to also be recorded. An alternate, simpler method is to record the data prior to recording the message, which would result in a slight delay of recording. In addition, and as also mentioned above, the microcomputer may include a counter which determines the duration of the telephone call, and that number also is recorded in the blank portion at the beginning of the message. The data appears at pin P28 and is passed to the read/record head of the message tape through an operational amplifier Z601A and through switch Z103C. At this time, the pin P10 of the microcomputer Z107 is high, so that switch Z103C is closed.

Figure 3:
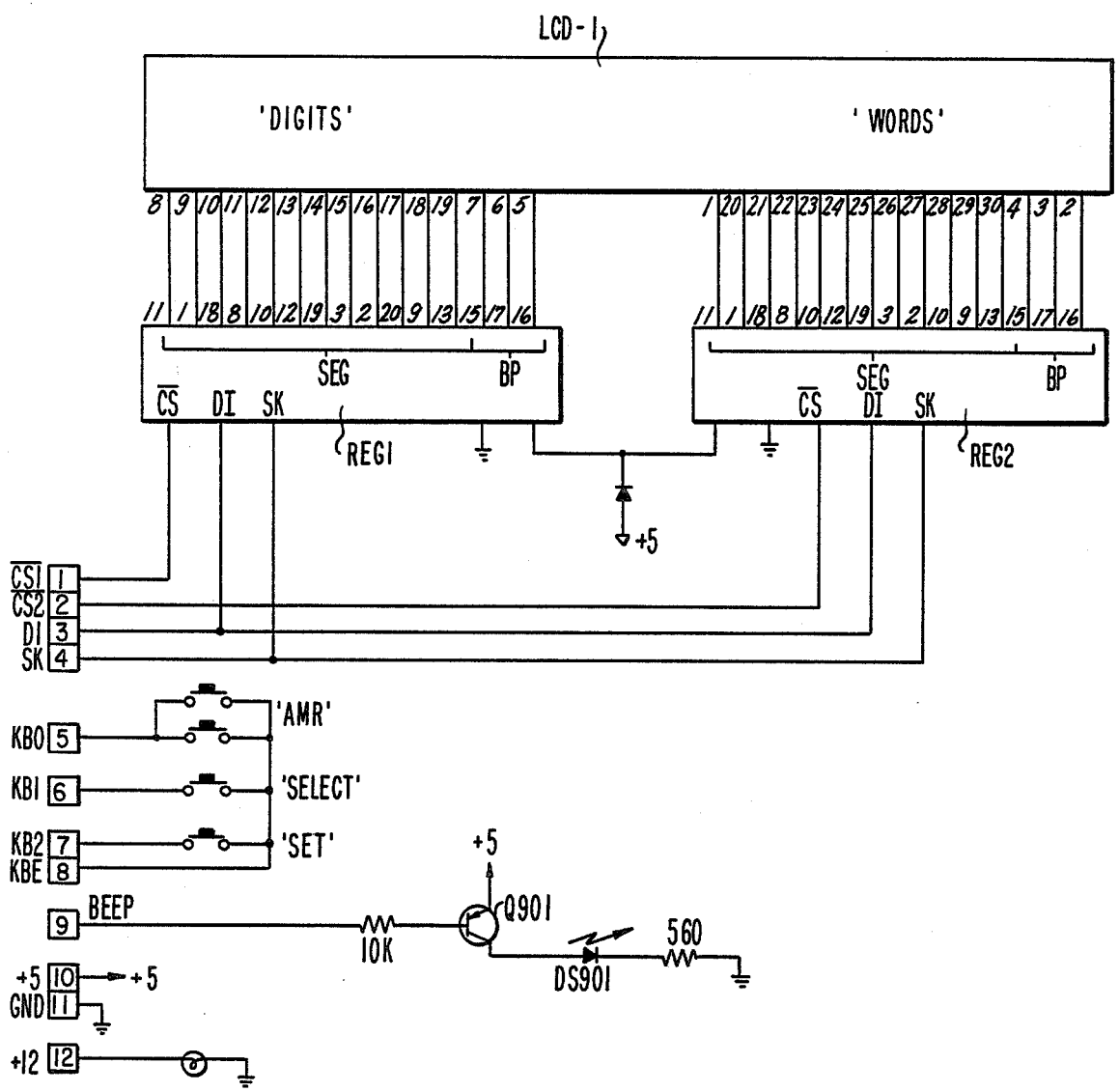
FIG. 3 constitutes a circuit diagram of a display incorporated in the machine on which the date and time of the various messages recorded in the machine are displayed.

To play back the messages recorded on the message tape, and the interposed data, the switch AMR is momentarily pressed, and this places the system in the playback mode. This causes the message tape to rewind to its origin position, and to then move forward, with the messages recorded on the message tape being amplified by amplifier Z105 of FIG. 1B and reproduced by a speaker SP1. During this time, pin P10 is high to close switch Z103C. The messages being played back and interposed data is also introduced to pin P31 of the microcomputer through operational amplifier Z103B. The computer processes the data, and generates corresponding outputs at pins P20, P21, P22 and P24 to control the system of FIG. 3. The system of FIG. 3 includes an LCD display designated LCD-1, which may be of the type designated E-9138-1. The outputs from pin P20–P24 of the microcomputer are fed to registers REG1 and REG2 which may be of the type designated COP472-3.

The system operates so that digits corresponding, for example, to the time and date of the message being played back appear to the left of the display and words corresponding to other data appear to the right of the display.

Accordingly, during playback, as each message is reproduced by the speaker SP1, the corresponding data associated with that message is displayed by the display LCD1. It should be appreciated that operational amplifiers Z601A and Z601B have appropriate resistors and other circuitry connected to them, as is well understood in the art.

As mentioned above, during the playback of each message, the internal counter of the microcomputer Z107 may count the time, beginning with the time that the message was received, so that the actual message receiving time, as displayed by the display may progress in a manner which is similar to the time progression during the time at which the call was made.

Moreover, the internal counter of the microcomputer may provide appropriate outputs so that the time duration of the message is displayed by the display at the beginning of playback of each message, with the time being kept in a reverse counting condition so that the user may see a constantly reducing remaining time required for playback of the current message.

It will be appreciated that the data recorded in the blank portions between messages on the message tape may be derived over the telephone line or from the computer, and a large variety of data may be so recorded, and displayed during playback of the message tape.

Only those portions of the circuitry of FIGS. 1A, 1B, 2A, 2B and 3 have been described which are essential to the understanding of the particular invention. The remaining circuitry may be of the type described in detail in U.S. Pat. No. 4,558,179, assigned to the present assignee.

It will be appreciated that while a particular embodiment of the invention has been shown and described, modifications may be made. It is intended in the claims to cover all modifications which come within the true spirit and scope of the invention.

We claim:

1. A telephone answering machine which includes a mechanism in which incoming messages received over a telephone line are recorded in sequence on a memory member, the combination of: ring detect circuitry connected to the telephone line and responsive to ring signals received over the telephone line for producing a control signal; a microcomputer connected to said ring detect circuitry and responsive to said control signal for delivering an outgoing message, for causing incoming messages received over the telephone line to be recorded on the memory member and for causing related data to be stored in said microcomputer; playback circuitry connecting said microcomputer to said mechanism for causing the mechanism to play back the messages and data recorded on the memory member; first control circuitry connected to said microcomputer for controlling the mechanism at the termination of each message received over the telephone line to cause the memory member to move back to a blank portion adjacent to the beginning of the last incoming message recorded on said memory member; circuitry connecting said microcomputer to said memory member to cause the data stored in the microcomputer to be recorded on said memory member in the corresponding blank portion and for subsequently introducing the data recorded on said memory member to said microcomputer during playback of the messages recorded on said memory member; a visual display device; and further circuitry connecting said microcomputer to said visual display device for causing the data recorded on the memory member to be displayed by said display device during playback of the messages recorded on said memory member.

2. The combination defined in claim 1, in which said mechanism comprises a magnetic tape mechanism, and said memory member comprises a magnetic tape.

3. The combination defined in claim 2, in which said first control circuitry causes said magnetic tape to move forward after said data stored in the microcomputer has been recorded in the blank portion of the tape adjacent to the beginning of the corresponding message, said tape moving from said blank portion to the end of such message and then stopping; and third control circuitry connected to said microcomputer for then placing the telephone answering machine in condition to respond to the next incoming message received over the telephone line.

4. The combination defined in claim 2, in which the data stored in said microcomputer and recorded on the blank portions of the magnetic tape corresponds to the time and date of the receipt of each of the incoming messages.

5. The combination defined in claim 1, in which the data stored in said microcomputer and recorded on the blank portions of the magnetic tape also corresponds to the duration of each of the incoming messages.

6. The combination defined in claim 1, in which said visual display device is caused to display for the duration of the playback of each message the time at which the corresponding message was received.

7. The combination defined in claim 1, in which said visual display device at the playback of the recorded messages is caused to display the time at which each message was initially received and the time progression of each message as it was being received.

8. The combination defined in claim 1, in which said visual display device is caused to display the duration time of each recorded message at the beginning of playback of such message with the duration time being reduced to zero as each message is played back.

* * * * *